United States Patent
Du et al.

(10) Patent No.: US 9,614,229 B2
(45) Date of Patent: Apr. 4, 2017

(54) FUNCTIONALIZED SHORT CHAIN FLUORINATED POLYETHER BASED ELECTROLYTES FOR SAFE LITHIUM BATTERIES AND THE CELLS HAVING THE SAME

(71) Applicants: Lin-Shu Du, Lansdale, PA (US); David Moureau, Hatfield, PA (US)

(72) Inventors: Lin-Shu Du, Lansdale, PA (US); David Moureau, Hatfield, PA (US)

(73) Assignee: MAXPOWER, INC., Harleysville, PA (US)

( * ) Notice: Subject to any disclaimer, the term of this patent is extended or adjusted under 35 U.S.C. 154(b) by 283 days.

(21) Appl. No.: 14/121,633

(22) Filed: Sep. 30, 2014

(65) Prior Publication Data
US 2016/0093895 A1    Mar. 31, 2016

(51) Int. Cl.
| | |
|---|---|
| H01M 6/00 | (2006.01) |
| H01M 6/16 | (2006.01) |
| H01M 12/06 | (2006.01) |
| H01M 2/16 | (2006.01) |
| H01M 4/62 | (2006.01) |
| H01M 10/42 | (2006.01) |

(52) U.S. Cl.
CPC ........... *H01M 6/168* (2013.01); *H01M 6/164* (2013.01); *H01M 12/06* (2013.01); *H01M 2/162* (2013.01); *H01M 4/622* (2013.01); *H01M 6/166* (2013.01); *H01M 10/4235* (2013.01); *H01M 2300/0034* (2013.01); *H01M 2300/0037* (2013.01)

(58) Field of Classification Search
USPC .................................................. 429/200, 224
See application file for complete search history.

(56) References Cited

U.S. PATENT DOCUMENTS

| | | | |
|---|---|---|---|
| 5,252,413 A | 10/1993 | Alamgir et al. | |
| 5,830,600 A * | 11/1998 | Narang | H01M 6/162 |
| | | | 429/199 |
| 6,168,885 B1 * | 1/2001 | Narang | H01M 4/0404 |
| | | | 29/623.1 |
| 6,455,200 B1 * | 9/2002 | Prakash | H01M 10/0525 |
| | | | 429/203 |
| 7,790,312 B2 | 9/2010 | Costello et al. | |
| 8,795,903 B2 | 8/2014 | Smart et al. | |
| 9,257,719 B1 * | 2/2016 | Liu | H01M 4/133 |

(Continued)

OTHER PUBLICATIONS

Patent Application # PCT US/2013/065396 of DeSimone et al.
(Continued)

*Primary Examiner* — Nina Bhat

(57) ABSTRACT

Non-flammable electrolyte compositions for lithium metal primary batteries and the cells containing these electrolytes are described. The electrolyte compositions comprise one or more partially or fully fluorinated functionalized short chain polyethers with one or more lithium salts, and may include one or more cosolvents, and may have one or more fire retardants added. Said short chain functionalized fluorinated polyethers have much better ionic conductivity than the alkyl terminated fluorinated polyethers or long chain perfluoropolyethers, which provide superior flame resistance without sacrificing overall battery performance. Heat resistant, non-flammable primary lithium cells are also disclosed.

12 Claims, 3 Drawing Sheets

(56) References Cited

U.S. PATENT DOCUMENTS

2004/0038133 A1    2/2004  Yamaguchi et al.
2006/0204857 A1    9/2006  Kejha et al.
2014/0272555 A1*   9/2014  Roelofs ................. H01M 4/485
                                                           429/200

OTHER PUBLICATIONS

Thania Benios : "Nonflammable Lithium Ion Battery Developed" in Science Daily, Feb. 10, 2014. Source : University of North Carolina at Chapel Hill.
Dominica H.C. Wong : "Nonflammable Perfluoroether Based Electrolytes for Lithium Batteries." In PNAS, Mar. 4, 2014. (vol. 111, No. 9, p. 3327-3331).
Liangbing Hu et al. : "Nonflammable Electrolyte Enhences Battery Safety". In PNAS, Mar. 4, 2014 (vol. 111, No. 9, p. 3205-3206).

* cited by examiner

FUNCTIONALIZED SHORT CHAIN FLUORINATED POLYETHER BASED ELECTROLYTES FOR SAFE LITHIUM BATTERIES AND THE CELLS HAVING THE SAME

BACKGROUND OF THE INVENTION

Field of the Invention

This invention relates to safe, fire resistant, stable electrolytes for lithium primary batteries, which electrolytes include a partially or fully fluorinated, functionalized polyether with a lithium salt and a cosolvent, and may have an additional fire retardant material added. These electrolytes have performance characteristics comparable to existing highly flammable electrolytes, have a wider operating temperature span, and are non-flammable even under extreme conditions. This invention also pertains to the battery cells having said electrolytes therein.

Description of the Prior Art

It has been recognized that there is a need for safe, non-flammable primary lithium batteries, with a wide operating temperature range especially in military applications.

Prior art electrolytes that have high ionic conductivity are very flammable, due to the inclusion of low boiling point flammable solvents, which causes the batteries to explode and catch on fire if used in high temperature environments like a desert, or in enclosures without cooling or when abused and shorted. A similar problem exists with Li—$SO_2$ catholyte batteries. Prior art electrolytes with high boiling solvents are safer, but suffer from low ionic conductivity at low temperatures. Examples are U.S. Pat. No. 5,252,413 of Alamgir et al., and U.S. Pat. No. 6,280,881 of Wendajo et al., and Patent Application No. US 2006/0204857 of Kejha et al.

To overcome these problems, the low boiling solvent electrolytes have been modified through the addition of fire-retardant additives to electrolyte formulations, such as U.S. Pat. No. 8,795,903 of Smart et al., but the additives degrade ionic conductivity and suffer compatibility issues with the electrodes. Because these additives can only be used in small quantities without significant negative impact on performance, the fire retardance conferred by their use may be inadequate for safety tests in more extreme conditions, such as puncture and bullet tests. On the other hand, fluorinated ethers (such as hydrofluoroethers, perfluorethers) and fluorinated polyethers with alkyl terminal groups have been proposed as nonflammable electrolyte solvents, due to their superior fire resistance. Examples are: US Patents Application No. US 2004/0038133 of Yamaguchi et al. To date, poor salt solubility and miscibility issues have limited their usefulness in broad applications. Similar approach has employed a dimethyl carbonate terminated long chain (10 or more polymer units) perfluoropolyether (PFPE) as the sole nonflammable electrolyte solvent in conjunction with LiTFSI as the lithium salt, as reported by DeSimone et al. from University of North Carolina—in Science Daily on Feb. 10, 2014. This improved the ionic conductivity of the fluorinated polyether, but the ionic conductivity of this system is still impractically low, and as reported, this electrolyte is directed only for use in secondary lithium ion batteries.

Instant invention overcomes these problems and provides safe, non-flammable, highly conductive electrolyte for primary batteries with a wide operating temperature range (−20° C. to 180° C.), and also provides primary battery cells with the same characteristics and many positive advantages over prior art primary batteries.

SUMMARY OF THE INVENTION

It has now been found, that a safe, fire resistant, non-flammable electrolyte for lithium primary batteries, and the cells with this electrolyte therein can be made by using a functionalized partially or fully fluorinated short chain polyether as a main nonflammable component in the electrolyte mixture with a lithium salt, which mixture may also contain a cosolvent. Additionally, fire retardants such as hydrofluoroethers, phosphites, phosphates, and phosphazenes from trace amounts to 40% by weight may be added. The short chain fluorinated polyether has a general structure represented by the following formula: $R—(C_xF_{2x-y}H_yO)_m—R'$, wherein x, y and m represent integers with x=1 to 3, y=0 to 2x−1, m=1 to 9 and the terminal R groups (R, R' where R may or may not equal R') are selected from the list of esters, carbonates, carboxylic acids, alcohols, nitriles, amines, amides, lactones, lactams, sulfates, sulfonates, sulfones, sultones, phosphates, phosphites, phosphonates, and phosphazenes. The cosolvent(s) in the range of 0-80% are selected from the group consisting of esters, ethers, carbonates, nitriles, imides, lactones, sulfones, sulfonates, sultones, sulfolanes, ionic liquids, and their mixtures. The lithium salts are selected from the group consisting of $LiPF_6$, $LiBF_4$, $LiClO_4$, $LiN(SO_2F)_2$, $LiN(SO_2CF_3)_2$, $LiB(C_2O_4)_2$, $LiSO_3CF_3$ and their mixtures. The preferred cosolvents are gamma-butyrolactone (GBL) and a dinitrile and the preferred salts are $LiBF_4$ and $LiN(SO_2CF_3)_2$.

As a typical example of the battery cell useful for inclusion of these electrolytes, a prismatic primary bi-cell has been selected, which bi-cell comprises: (2) lithium metal anodes with (1) full width nickel tab, attached and exiting from moisture proof enclosure; (1) $V_2O_5$ cathode coated on both sides of an aluminum foil or grid current collector, fully wrapped by porous electrically insulating heat resistant separator, and inserted between said anodes. The cathode also has full width nickel tab welded to the aluminum current collector, and exiting from the enclosure in insulated and sealed manner. The bi-cell can be also reversed having one anode in the middle and (2) cathodes outside. Whole bi-cell is then wrapped by insulating and heat resistant sheet of Teflon or Kapton polymer, inserted into the hard metal enclosure, activated by said electrolytes and laser weld sealed. Other cells construction may be also used with the electrolytes, such as rolled cylindrical or flat wound cells.

Such batteries are non-flammable and heat resistant as well as operating in low temperatures to −20° C. Other cathode materials may also be used, such as $CF_x$ and FeS, air and S.

The principal object of the invention is to provide electrolyte for lithium primary batteries that have good ionic conductivity and are fire resistant and non-flammable.

A further object of the invention is to provide electrolytes of the character aforesaid, which provide improved ionic conductivity at low temperatures.

A further object of the invention is to provide electrolytes of the character aforesaid, which are useful in a variety of electrochemical devices, such as military batteries and semi-fuel cells.

A further object of the invention is to provide electrolytes of the character aforesaid, which are particularly suitable for mass production.

A further object of the invention is to provide lithium primary battery cells and semi-fuel cells, which are heat resistant and non-flammable.

A further object of the invention is to provide lithium primary battery cells and semi-fuel cells, which are functioning well at high and low temperatures.

A further object of the invention is to provide lithium primary battery cells and semi-fuel cells, which are suitable for military applications and mass production.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawing forming part thereof in which.

Figure 1:
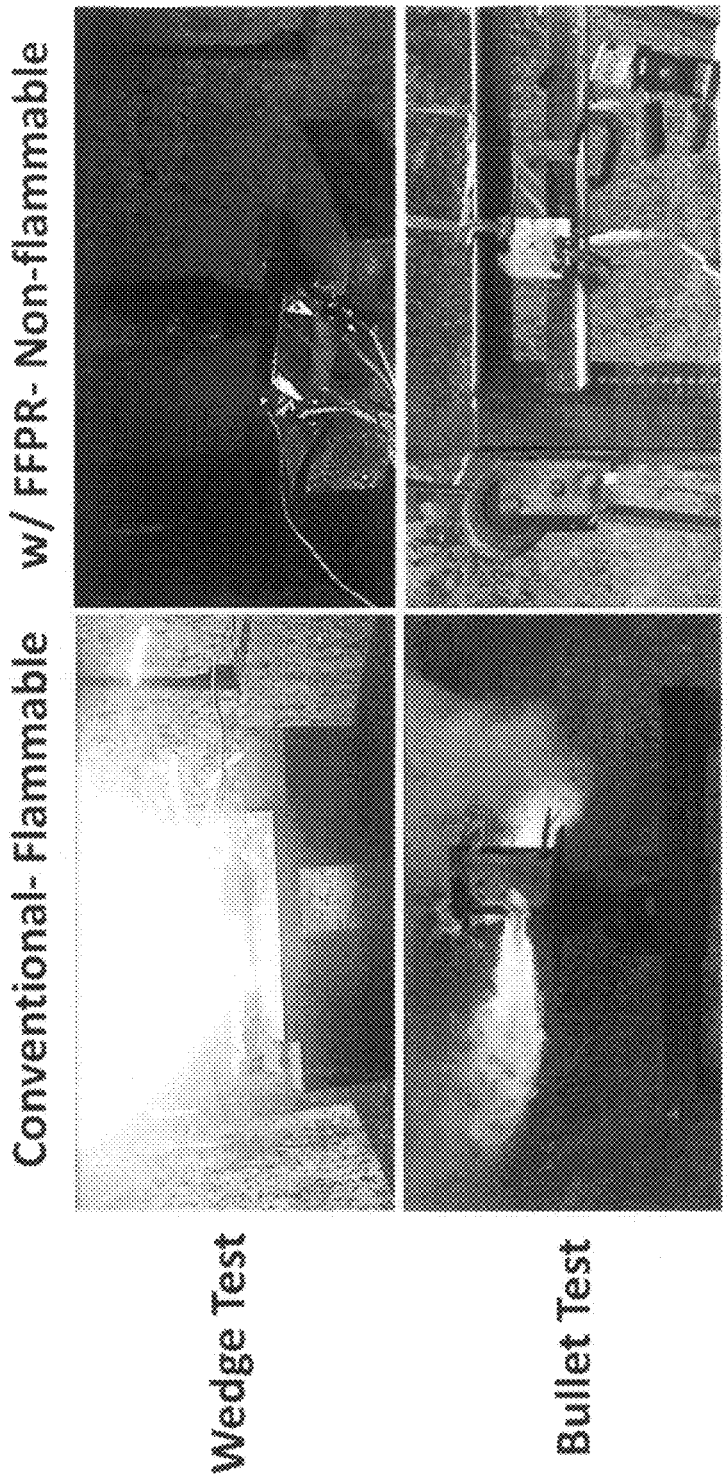
FIG. 1 contains images of cell conditions under Wedge (Puncture) Test and Bullet Test, showing the cells containing conventional electrolyte (with ether and lactone solvents) which failed the two tests, and the cells with FFPE containing electrolyte which passed the two tests without any smoke or flame throughout the test time.

It should, of course, be understood that the description and drawings herein are merely illustrative, and that various modifications and changes can be made in the compositions and the structures disclosed without departing from the spirit of the invention.

DESCRIPTION OF THE PREFERRED EMBODIMENTS

When referring to the preferred embodiments, certain terminology will be utilized for the sake of clarity. Use of such terminology is intended to encompass not only the described embodiments, but also technical equivalents, which operate and function substantially the same way to bring about the same result.

An electrochemical device, such as lithium primary battery typically includes a lithium metal anode(s), and a current collector tab in contact with the anode(s), a cathode(s) capable of accepting lithium ions upon discharge, and a current collector in contact with the cathode(s), separator(s), and an electrolyte in contact with the anode(s), cathode(s), and separator(s) with the whole assembly contained in a moisture proof enclosure with exiting sealed terminals electro-conductively connected to the collectors and the electrodes. It is highly desirable that this battery is heat resistant and non-flammable in all environmental conditions and especially in hot environments or under abuse by overloads or shorts, where conventional batteries are particularly unsafe. The non-flammability is mainly achieved by inclusion of a non-flammable electrolyte therein, but the electrolyte must be also highly ionically conductive within a wide temperature span, so that the battery can perform satisfactorily in these extreme conditions, primarily in military applications.

Preferred electrolytes of the invention, which achieved the characteristics described above contain at least one functionalized, partially or fully fluorinated short chain polyether (FFPE), which may be in combination with a cosolvent from trace amount to 80% (percent) by weight, and the cosolvent is selected from the group consisting of esters, carbonates, nitriles, imides, lactones, sulfones, sulfonates, sulfolanes, sultones, ionic liquids, and their mixtures. These compositions also have at least one lithium salt added, which salt is selected from the group consisting of $LiPF_6$, $LiBF_4$, $LiClO_4$, $LiN(SO_2F)_2$, $LiN(SO_2CF_3)_2$, $LiB(C_2O_4)_2$, $LiSO_3CF_3$, $LiNO_3$, and their mixtures. The more preferred cosolvents are gamma-butyrolactone and a dinitrile, such as succinonitrile. The more preferred salts are $LiBF_4$, $LiN(SO_2CF_3)_2$ and $LiN(SO_2F)_2$.

The short chain polyether has preferably a general structure represented by the following formula: $R-(C_xF_{2x-y}H_yO)_m-R'$ wherein x, y and m represent integers with x=1 to 3, y=0 to 2x−1, and m=1 to 9 and R, R' represent functional groups selected from the list of esters, carbonates, carboxylic acids, alcohols, nitriles, amines, amides, lactones, lactams, sulfates, sulfonates, sulfones, sultones, phosphates, phosphites, phosphonates, and phosphazenes. The more preferred functional groups are methyl carbonate, N,N-dimethyl amide, and propylene carbonate. The chemical structure of the electrolyte solvent may contain one or more polymer units (i.e. co-polymers) defined in the formula backbone and/or branch sections, wherein the functionalization of the fluorinated polyethers are defined as such by the presence of functional groups in the chemical structure of the electrolyte solvent such as esters, carbonates, carboxylic acids, alcohols, nitriles, amines, amides, lactones, lactams, sulfates, sulfonates, sulfones, sultones, phosphates, phosphites, phosphonates, and phosphazenes.

To provide an additional fire quenching mechanism, fire retardants, such as hydrofluoroethers, phosphites, phosphates and phosphazenes from trace amounts to 40% (percent) by weight may be added.

In order to compare the non-flammable electrolyte of the invention with prior art typical flammable electrolyte with gamma-butyrolactone (GBL) and dimethyl ether (DME), the following examples of electrolyte compositions has been made.

| EXAMPLE #1: (Flammable electrolyte) | EXAMPLE #2 (Electrolyte of the invention) |
|---|---|
| 1.2M $LiBF_4$ in GBL/DME (1:1) | 1.0M $LiBF_4$ in FFPE/GBL (70:30) |

Wedge (Puncture) tests and bullet tests were performed at room temperature on primary $CF_x$ cells with electrolytes EXAMPLE #1 and #2, to evaluate the flammability. The cells filled with EXAMPLE #1 electrolyte exploded immediately in both tests. The cells filled with example #2 electrolyte did not catch on fire at all. Images of test results are shown in FIG. 1, which is one embodiment of the invention.

Figure 2:
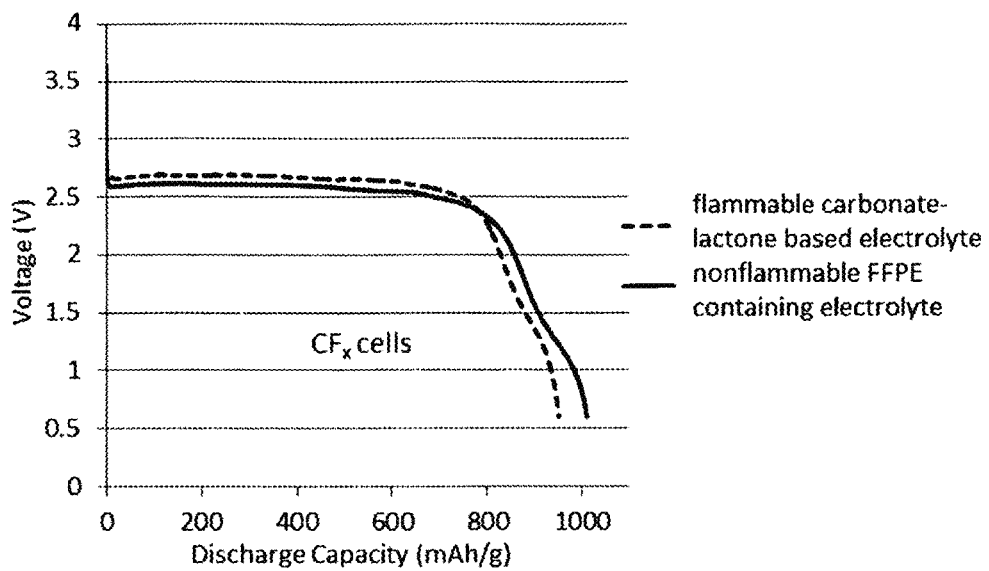
FIG. 2 is a voltage vs. capacity plot of the cell with conventional flammable electrolyte and the cell with FFPE containing nonflammable electrolyte of the invention, both having $CF_x$ cathodes.

To evaluate the electrochemical performance, identical primary $CF_x$ cells were activated by the two electrolytes (Example #1 and #2). The performance of the cells is shown in FIG. 2, which is another embodiment of the invention. The result shows that the FFPE containing non-flammable electrolyte does not have negative impact on cell performance in comparison to flammable electrolyte.

Figure 3:
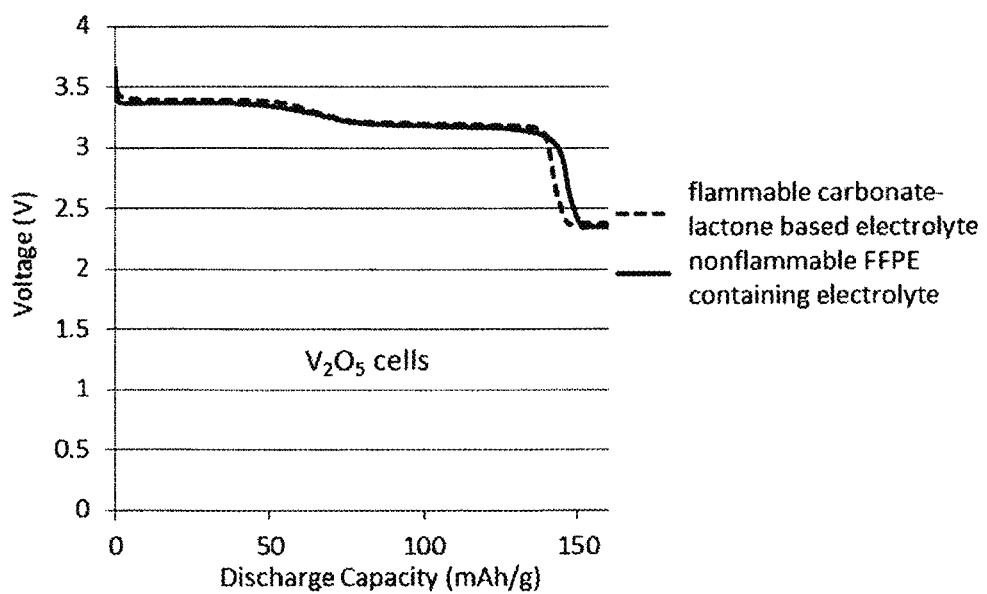
FIG. 3 is a voltage vs, capacity plot of the cell with conventional flammable electrolyte and the cell with FFPE containing nonflammable electrolyte of the invention, both having $V_2O_5$ cathodes.

Additionally, Identical primary $V_2O_5$ cells were also activated by the two electrolytes (Example #1 and #2). The performance of the cells is shown in the FIG. 3, which is another embodiment of the invention. The result again shows that the FFPE containing non-flammable electrolyte does not have negative impact on cell performance in comparison to flammable electrolyte.

Figure 4:
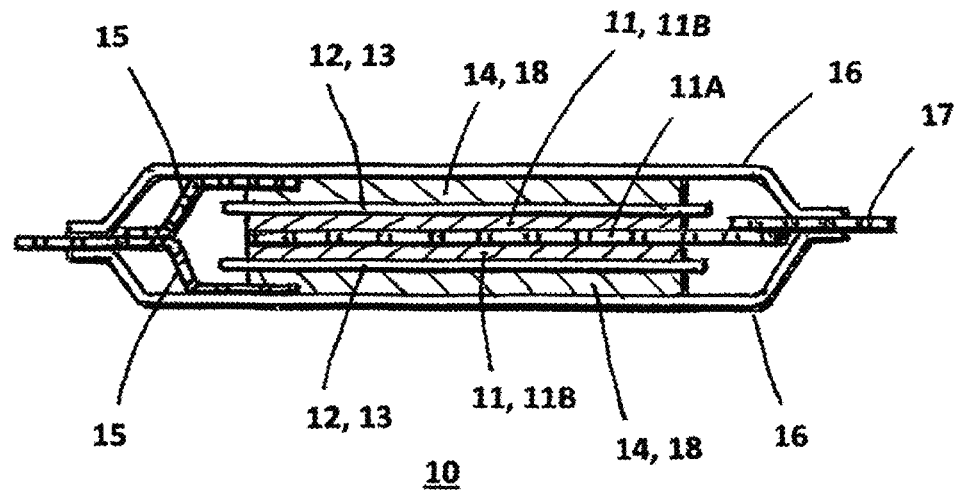
FIG. 4 is a vertical sectional view of a battery constructed in accordance with the invention.
Figure 5:
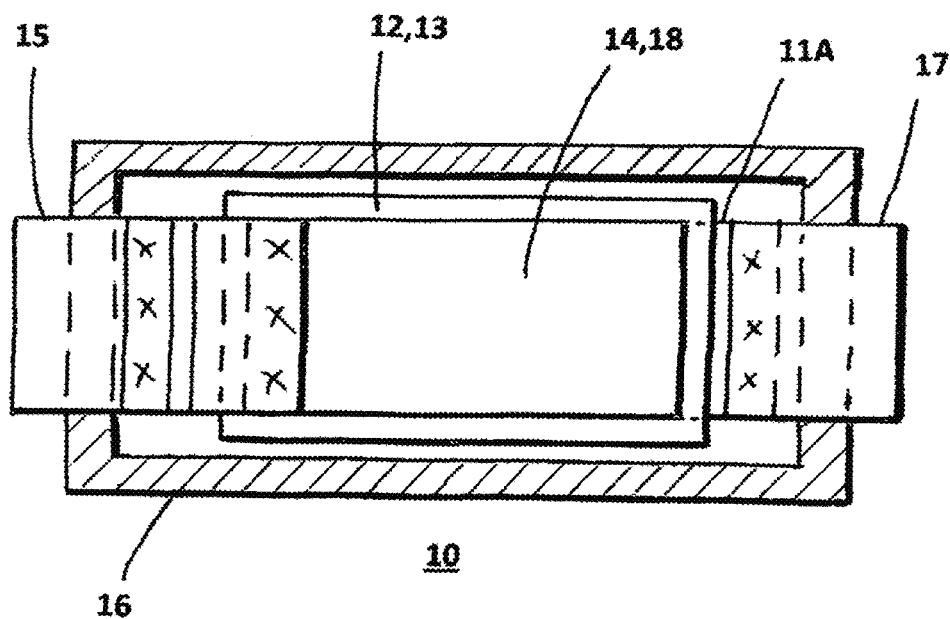
FIG. 5 is a top sectional view of a battery constructed in accordance with the invention.

Referring now to the drawings FIG. 4 and FIG. 5, the non-flammable electrolyte containing cell or battery 10 is therein illustrated, which is shown as a prismatic bi-cell, which is another embodiment of the invention. The cell 10 has a cathode 11 in the middle and comprises preferably aluminum grid or foil collector 11A coated with cathode particles, plus Super-P, Ketjen Black, or graphene attached and held together by a heat resistant binder, preferably polyamide. Two porous insulating separators 12 are placed on both sides of the cathode 11, and soaked by electrolyte 13 described above, as well as the cathode is soaked by the electrolyte, all under argon or other inert atmosphere. The separators are preferably of heat resistant aramid fibers non-woven material. Two anodes 14 of lithium foils or plates are placed on and in contact with the separators 12; and the electrolyte 14, and have preferably nickel grid tabs terminal 15 electro-conductively attached to the lithium foils. This cell or battery 10 is enclosed in a moisture proof enclosure 16 with the terminals 15 existing in a sealed and insulated manner. The terminals 15 are preferably full width of the lithium electrode, as shown. The cathode aluminum current collector 11A also exists from the enclosure 16 in a sealed and insulated manner, or optionally may have electro conductively attached another full width terminal tab 17 of nickel grid or foil, existing in sealed and insulated manner. The cell 10 maybe heat sealed in flexible metal foil and plastic enclosure 16 under vacuum, which provides atmospheric pressure for the outside and thus for good contacts of all components, or the enclosure is made from a tight and hard metal structure to hold the cells together (not shown) .The bi-cell depicted, could also be reversed with anode in the middle and two cathodes on the outside; or it can be a well-known single cell structure (not shown). Also, several single or bi-cells may be placed in the enclosure 16 and connected electrically in parallel (not shown). The cathode material 11 is preferably $V_2O_5$, but other materials suitable for insertion of lithium upon discharge can be used, such as $CF_x$, FeS, $MnO_2$, and sulfur mixed with carbon (C/S). Other cell constructions can be used for containing this non-flammable electrolyte, such as rolled cylindrical and flat wound cells, and lithium air type cells (not shown), while using the same heat resistant materials. It has also been discovered, that the described electrolytes are resistant to oxidation, which makes them particularly suitable for lithium-air cells, and that they can also be used in lithium-ion type cells.

It will thus be seen, that electrolyte compositions and cells constructions have been provided with which the objects of the invention are achieved.

We claim:

1. A fire resistant, non-flammable and stable electrolyte composition for lithium primary batteries, which electrolyte composition contains at least one functionalized fluorinated short chain polyether which has a general structure represented by formula:

R—$(C_xF_{2x-y}H_yO)_m$—R', wherein x, y and m represent integers with x=1 to 3, y=0 to 2x-1, m=1 to 9, and R, R' represent functional groups, selected from the group consisting of esters, carbonates, carboxylic acids, alcohols, nitriles, amines, amides, lactones, lactams, sulfates, sulfonates, sulfones, sultones, phosphates, phosphites, phosphonates, and phosphazenes, and said polyether is present from trace amount to 90% (percent) by weight.

2. A fire resistant, non-flammable and stable electrolyte composition for lithium primary batteries as described in claim 1, further comprising at least one lithium salt, at least one short chain polyether and a cosolvent.

3. A fire resistant, non-flammable and stable electrolyte composition as described in claim 1, wherein said functionalized fluorinated polyether defined as terminal groups in the polymers containing functional groups selected from the group consisting of esters, carbonates, carboxylic acids, alcohols, nitriles, amines, amides, lactones, lactams, sulfates, sulfonates, sulfones, sultones, phosphates, phosphites, phosphonates, and phosphazenes.

4. A fire resistant, non-flammable and stable electrolyte composition as described in claim 2, in which said cosolvent is selected from the group consisting of esters, carbonates, carboxylic acids, alcohols, nitriles, amines, amides, lactones, lactams, sulfates, sulfonates, sulfones, sultones, phosphates, phosphites, phosphonates, and phosphazenes.

5. A fire resistant, non-flammable and stable electrolyte composition as described in claim 1, in which said lithium salt is selected from the group consisting of $LiPF_6$, $LiBF_4$, $LiClO_4$, $LiN(SO_2F)_2$, $LiN(SO_2CF_3)_2$, $LiB(C_2O_4)_2$, $LiBF_2CO_4$, $LiSO_3CF_3$, $LiNO_3$, and their mixtures.

6. A fire resistant, non-flammable and stable electrolyte composition as described in claim 2, in which said cosolvent is present from trace amount to 80% (percent) by weight.

7. A fire resistant, non-flammable and stable electrolyte composition as described in claim 1, which additionally contains fire retardant materials selected from the group consisting of hydrofluoroethers, phosphites, phosphates, phosphazenes, and their mixtures.

8. An electrolyte composition as described in claim 7, in which said fire retardant materials are present from trace amounts to 40% (percent) by weight.

9. A fire resistant, non-flammable and stable lithium primary battery, having anode(s) cathode(s), and separator(s), which battery contains therein a fire resistant, non-flammable and stable electrolyte composition, as described in claim 1.

10. A fire resistant, non-flammable and stable lithium primary battery, as described in claim 9, in which said cathode(s) material is selected from the group consisting of $V_2O_5$, $CF_x$, $FeS_2$, $MnO_2$, C/S and C/Air.

11. A fire resistant, non-flammable and stable lithium primary battery, as described in claim 9, in which said separator(s) material is high temperature resistant aramid fibers non-woven.

12. A fire resistant, non-flammable and stable lithium primary battery, as described in claim 9, in which said cathode has binder of polyamide material.

* * * * *